H. BOGATY.
LOOPING DEVICE FOR DRIERS.
APPLICATION FILED JULY 18, 1921.
1,421,153.
Patented June 27, 1922.
2 SHEETS—SHEET 1.
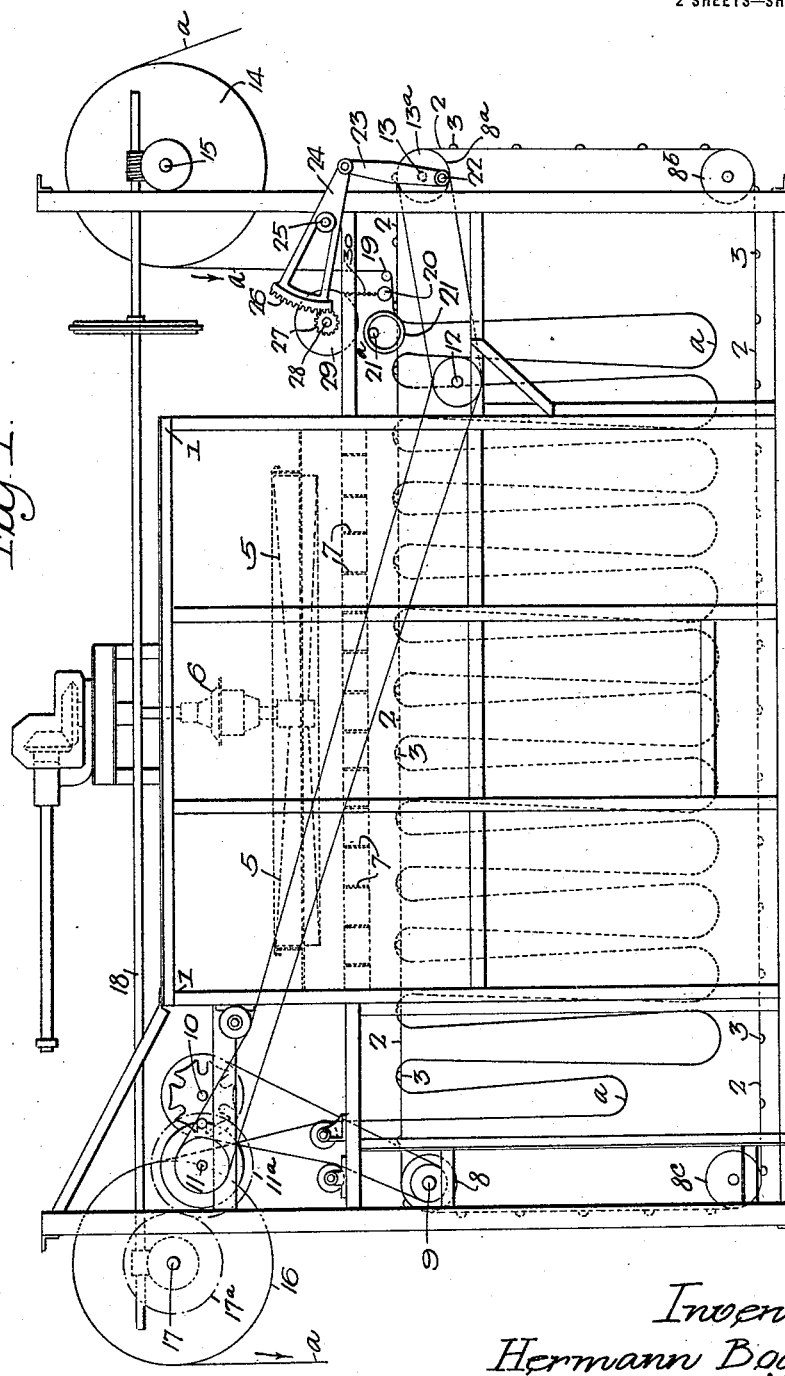
Inventor—
Hermann Bogaty.
by his Attorneys.

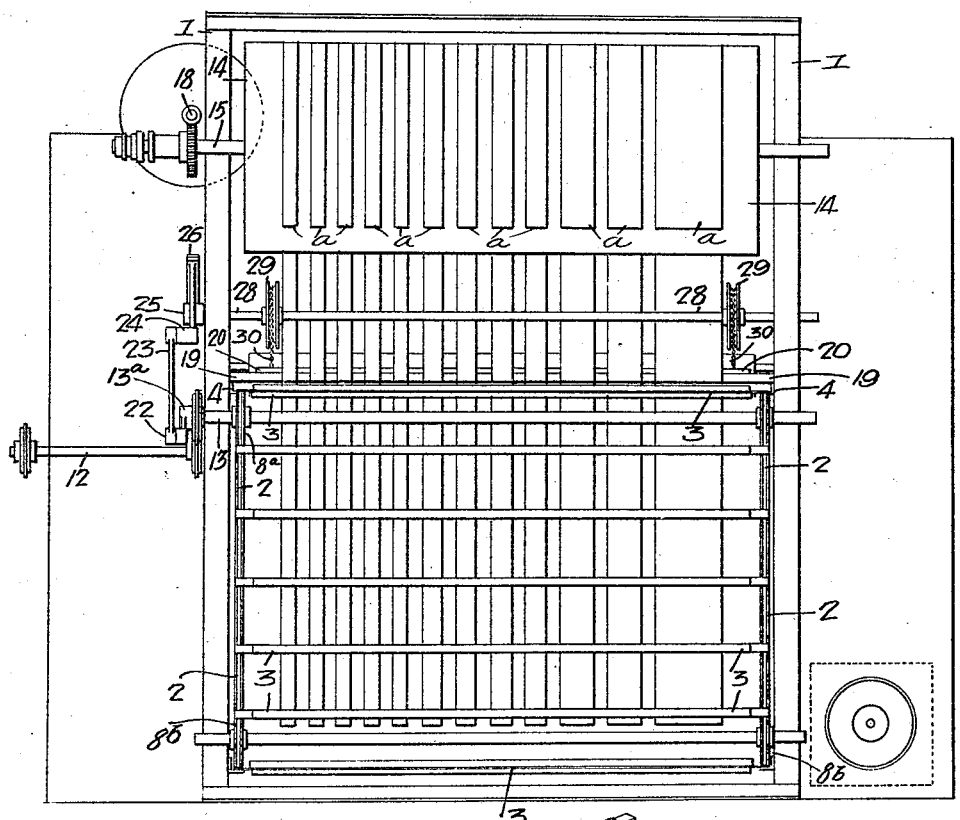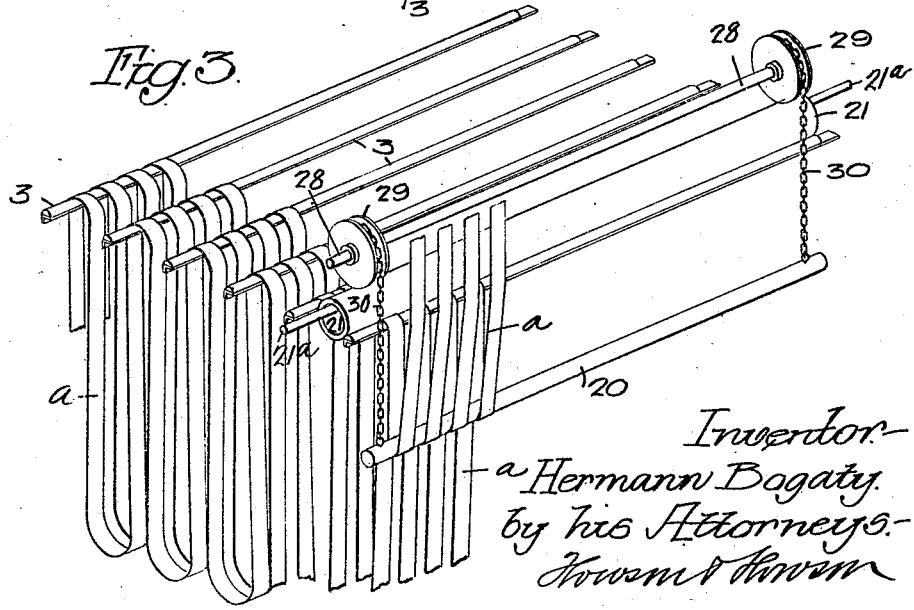

UNITED STATES PATENT OFFICE.

HERMANN BOGATY, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA.

LOOPING DEVICE FOR DRIERS.

1,421,153.  Specification of Letters Patent.  Patented June 27, 1922.

Application filed July 18, 1921. Serial No. 485,470.

*To all whom it may concern:*

Be it known that I, HERMANN BOGATY, a citizen of the United States, residing in Philadelphia, Pennsylvania, have invented certain Improvements in Looping Devices for Driers, of which the following is a specification.

One object of my invention is to construct a drier for continuously drying strip material, which is formed into loops while passing through the drier.

A further object of the invention is to provide means for forming these loops, especially in comparatively stiff material.

The invention is particularly adapted for drying strip material, such as brake linings for automobiles, although it will be understood that it can be used for drying other materials, which are of considerable length.

In the accompanying drawings:

Fig. 1 is a side view of my improved drying machine;

Fig. 2 is an end view; and

Fig. 3 is a diagrammatic perspective view illustrating the means for forming the loop in the material.

1 is the frame of the drier. 2 is an endless belt conveyer having a series of cross rods 3 for supporting the looped material $a$. This conveyer may be supported by angle bars 4 on the frame. 5 is a circulating fan mounted on a vertical shaft 6 driven in any suitable manner. Below the fan are baffles 7 for evenly distributing the air in circulation. The air in circulation may be heated in any suitable manner.

The conveyer 2 passes around guide wheels 8, $8^a$, $8^b$ and $8^c$. The guide wheels 8 are driving wheels, each mounted on a shaft 9 driven from a shaft 10, in the present instance, which is intermittently driven by star wheel mechanism from a driven shaft 11. A counter shaft 12 is driven by a belt from the shaft 11 and this driving shaft in, turn, through a second belt, drives the shaft 13 on which is a crank disk $13^a$.

The material to be dried passes around a drum 14 on a shaft 15 and after passing through the machine is directed over a drum 16 mounted on a shaft 17. The two shafts 17 and 15 are connected through worm and worm wheel gearing to a longitudinal driving shaft 18, so that they rotate in unison. The shaft 11 is driven from the shaft 17 through gear wheels $17^a$ and $11^a$ fixed to the shafts 17 and 11 respectively. The material, which is to be looped, is usually made in narrow strips, and a number of these strips can be arranged side by side and can pass through the machine together, as shown in Fig. 2. The material shown is what is known as "brake lining," being a heavy woven fabric, usually of asbestos and a suitable binder. As this material is comparatively stiff, it is difficult to loop it on the sticks 3. The fabric passes around a guide roller 19 at the forward end of the machine, and the stick 3, over which it is to be looped, is moved in advance of this roller. At this point, a heavy bar 20 is lowered, which causes the material, as it is fed from the drum 14, to form a loop over the stick 3. A tubular roller 21 hung on a bar $21^a$ back of the bar 20 so that, when the bar 20 is lowered, the roller 21 will press the material against one of the rods which will prevent the bar from drawing the material from the loop previously formed. As the rod moves forward it will push past the roller 21, which will assume a position in front of the next rod.

In order to time the lowering of the bar with the intermittent movement of the conveyer, the bar-lowering means is connected to a crank pin 22 on the disk $13^a$. The link 23, which is connected to the crank pin, is, in turn, connected to one arm of a lever 24 pivoted at 25 to the frame. This lever has a toothed segment 26, the teeth of which mesh with a pinion 27 on a shaft 28 on which are the chain wheels 29. Chains 30 are attached to these chain wheels and are also attached to the bar 20 so that, on the elevation of the disk $13^a$, the bar will be lowered and a loop will be formed in the material. This bar is lowered when the conveyer is at rest.

By this construction, comparatively stiff material can be easily looped. It is only necessary to complete a loop by continuing the movement of the bar. The loop can be partly formed by the bar, the weight of the material being oftentimes sufficient to complete the formation of the loop.

I claim:

1. The combination in a drying machine, in which the material to be dried is formed into loops, of a casing; an endless conveyer having bars; means for intermittently moving the conveyer; means for feeding material to the conveyer; and a device, at the feed end of the machine, engaging the material and forming it into a loop between the bars as they are presented.

2. The combination in a drier, of a conveyer having a series of cross rods; means for intermittently feeding the conveyer; means for feeding the material to the machine; a bar extending across the machine and arranged to form initial loops in the material; and means for lowering the bar in contact with the material while the conveyer is at rest.

3. The combination in means for drying strip material, of an endless belt conveyer having cross rods; means for intermittently moving the conveyer; a bar for initially forming a loop of material; a guide in advance of the bar; means for holding the previously formed loop, said means being located back of the bar; and means for lowering the bar to form another loop.

4. The combination in a drier, of an endless conveyer having a series of cross rods from which the material to be dried is suspended in the form of loops; means for intermittently moving the conveyer; a bar extending across the machine; a shaft; chain wheels on the shaft; chains attached to the chain wheels and to the bar; a pinion on the shaft; a lever having a toothed segment meshing with the teeth of the pinion; and a crank for operating the lever to raise and lower the bar.

HERMANN BOGATY.